United States Patent

[11] 3,577,618

| [72] | Inventor | Robert W. Cashman<br>Saginaw, Mich. |
|---|---|---|
| [21] | Appl. No. | 753,571 |
| [22] | Filed | Aug. 19, 1968 |
| [45] | Patented | May 4, 1971 |
| [73] | Assignee | Saginaw Machine and Tool Company<br>Saginaw, Mich. |

[54] TOOLHOLDER CONSTRUCTION
17 Claims, 5 Drawing Figs.

| [52] | U.S. Cl. | 29/96 |
|---|---|---|
| [51] | Int. Cl. | B26d 1/00 |
| [50] | Field of Search | 29/95, 96, 98, 105, 105.1, 97 |

[56] References Cited
UNITED STATES PATENTS

| 2,808,638 | 10/1957 | Filippi | 29/96 |
|---|---|---|---|
| 3,084,416 | 4/1963 | Broughton | 29/96 |
| 3,310,859 | 3/1967 | Diemond | 29/96 |
| 3,316,616 | 5/1967 | Milewski | 29/96 |
| 3,371,567 | 5/1968 | Davis | 29/97 |

*Primary Examiner*—Harrison L. Hinson
*Attorney*—Learman & McCulloch

ABSTRACT: A toolholder comprising an elongated body terminating at its forward end in a recess provided with a rearward arcuate wall and within which is mounted a correspondingly-shaped tool bit support having a pocket defined by a base and a pair of upstanding sides which converge both upwardly and rearwardly. A tool bit having a shape corresponding to the shape of the pocket is removably accommodated in the latter and is provided with a central opening for the reception of a lug formed on a clamp which overlies the tool bit and is anchored to the holder body. The clamp and the clamp anchor are so oriented with respect to the tool bit that anchoring of the clamp causes the latter to rock about a fulcrum in such manner as to urge the tool bit forcibly against the base of the pocket and forcibly against the sidewalls of the pocket.

PATENTED MAY 4 1971

3,577,618

INVENTOR
ROBERT W. CASHMAN

BY Learman & McCulloch
Attys.

TOOLHOLDER CONSTRUCTION

The invention disclosed herein relates to a toolholder of the kind especially adapted for the removable accommodation of an indexable, replaceable tool bit. More particularly, the invention relates to a holder for an indexable, replaceable tool bit which is supported in the holder in such manner that clamping pressure and cutting pressure automatically urge the tool bit to a more firmly seated position in the holder.

One of the greatest causes of tool bit breakage and wear is vibration of the bit during cutting operations. Breakage due to vibration is particularly prevalent in those instances where the tool bit is formed from an extremely hard, brittle material such as carbide. Vibration usually is caused by two factors; namely, looseness of the tool bit in its support, and harmonics generated in the bit as a result of its position relative to the workpiece with which it is associated.

An object of this invention is to provide a toolholder construction in which a bit is supported in such manner as to minimize greatly the possibility of tool bit vibration.

Another object of the invention is to provide a toolholder for a removable bit and in which clamping of the bit in the holder automatically urges the bit forcibly against the supporting surfaces of the holder.

A further object of the invention is to provide a tool bit holder of the character referred to and in which pressure caused by the reaction between the tool bit and the workpiece automatically urges the tool bit into forcible engagement with its supporting surfaces.

Another object of the invention is to provide a tool bit holder in which the tool bit may be adjusted relatively to its holder so as to enable the bit to be presented to a workpiece at an optimum position.

Other objects and advantages of the invention will be pointed out specifically or will become apparent from the following description when it is considered in conjunction with the appended claims and the accompanying drawings, in which:

Figure 1:
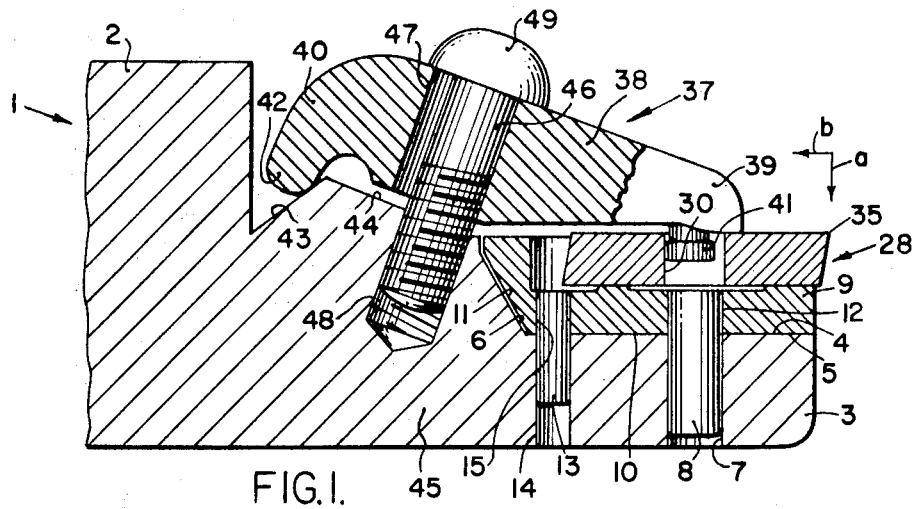
FIG. 1 is a fragmentary, longitudinal sectional view of a tool holder constructed in accordance with the invention and illustrating a tool bit clamped in position in a support carried by the tool holder.

A toolholder constructed in accordance with the invention is designated generally by the reference character 1 and comprises an elongated body 2 terminating at its forward end 3 in a recess 4 having a flat base 5 and an arcuate rearward wall 6. The arcuate wall 6 preferably is inclined upwardly and rearwardly from the base 5 and is formed on a circle having its center at the point C. The body 2 is provided with a vertical bore 7 the axis of which is coincident with the point C and in which is fixed a pivot pin 8 that projects above the base 5.

A tool bit support 9 is accommodated in the recess 4 and has a flat bottom 10 which seats upon the base 5 of the recess. The support 9 has a rear wall 11 which complements the curvature and inclination of the recess rear wall 6, the arc of the wall 11 having its center at the point C. The support 9 has an opening 12 coaxial with the bore 7 and in which is accommodated the pin 8. The arrangement is such that the member 9 is rotatable relatively to the holder body 2 about the axis of the pin 8.

Means is provided for fixing the support member 9 in any selected position of angular adjustment and comprises a pin 13 which is accommodated in aligned openings 14 and 15 formed in the members 2 and 9, respectively. It will be understood that the location of the openings 14 and 15 will be decided upon after the relative positions of the members 2 and 9 have been determined in accordance with the type of cutting operation to be performed on a workpiece. That is, the openings 14 and 15 may be drilled just prior to setting up the tool holder for use. To facilitate the drilling operations, the body member 9 is provided with an elongated and enlarged opening 16 for the accommodation of a drill bit. An alternative means of securing the support member 9 in a selected position of angular adjustment is to silver solder the member 9 to the member 2 at the juncture of the walls 6 and 11.

Figure 2:
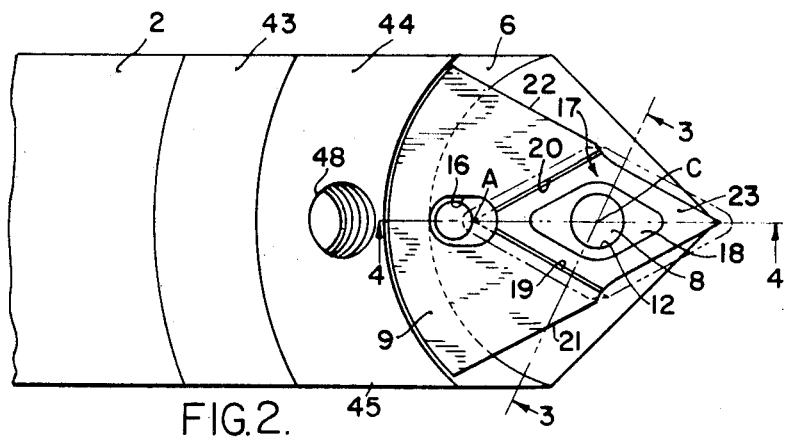
FIG. 2 is a top plan view of the apparatus shown in FIG. 1, but with the clamp removed and the bit shown in phantom lines for clarity.
Figure 3:
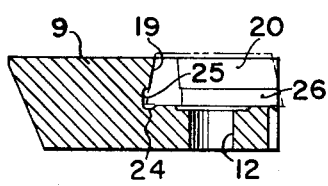
FIG. 3 is a sectional view taken on the line 3—3 of FIG. 2 and illustrating the tool bit in phantom lines.
Figure 4:
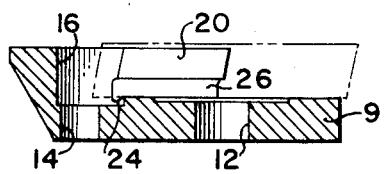
FIG. 4 is a view similar to FIG. 3, but taken on the line 4—4 of FIG. 2.

The bit-supporting member 9 is provided with a pocket 17 defined by a base 18 and a pair of upstanding sides 19 and 20 which converge rearwardly to a point A located on a radial from the axis C. The sides 19 and 20 also converge upwardly, as is best shown in FIGS. 3 and 4, so that their upper edges overhang the base 18. The sides 19 and 20 terminate at their forward ends at the respective edges 21 and 22 of the support member 9 so that the base 18 projects forwardly of the pocket sides, as is best shown in FIG. 2.

The base 18 preferably is provided with an upstanding, flat-surfaced ridge or seat 23 which surrounds the opening 12 and extends closely adjacent the pocket sides 19 and 20. Preferably, the base 18 is grooved as at 24 at its juncture with each pocket side and the pocket edges 19 and 20 are grooved as at 25 and 26, respectively, at their juncture with the base 18 for a purpose presently to be explained.

Figure 5:
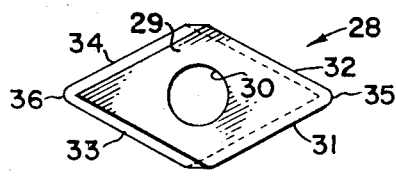
FIG. 5 is a top plan view of a bit adapted for use with the holder.

A tool bit adapted for use with the support 9 is designated generally by the reference character 28 and comprises a body 29 substantially diamond-shaped in plan and having an opening 30 at its center. The top and bottom surfaces of the bit 28 preferably are smooth and parallel. The body 29 has two pairs of sides 31, 32 and 33, 34, the sides of each pair converging in a direction away from the center of the body. The juncture of the sides 31 and 32 forms a cutting tip 35 and the juncture of the sides 31 and 32 forms a cutting tip 35 and the juncture of the sides 33 and 34 forms a cutting tip 36. As is best shown in FIG. 5, the sides 33 and 34 are not perpendicular to the plane of the body 29, but are inclined so as to complement the inclination of the pocket sides 19 and 20. The tool bit sides 31 and 32 similarly are inclined, but in such manner as to converge toward the opposite surface of the body. The arrangement is such that the bit may be inserted in the pocket with either cutting tip 35 or 36 projecting beyond the forward end of the support 9.

Clamping means 37 is provided for removably clamping the bit 28 in the pocket 17 and comprises an elongated member 38 having a forward end 39 and a rearward end 40. Adjacent, but spaced rearwardly from the forward end of the clamp member is a cylindrical projection or lug 41 of such size as freely to enter the opening 30 formed in the bit 28. At the rearward end of the clamp member is a smoothly rounded, downwardly extending nose 42. The nose 42 is adapted to seat upon a forwardly and upwardly inclined cam surface 43 provided on the body 2, the forward edge of the surface 43 merging with a downwardly and forwardly inclined, smooth surface 44 which terminates at the upper edge of the arcuate wall 6 so as to form a neck portion 45 for the body 2 rearwardly of the recess 4.

An anchor bolt 46 threaded at one end is adapted to be accommodated in an elongated opening 47 formed between the ends of the clamp member 38 for reception in a correspondingly threaded opening 48 formed in the neck portion 45 of the body. The axis of the opening 48 is perpendicular to the surface 44. The bolt 46 has an enlarged head 49 which is adapted to bear against the upper surface of the clamp so as to anchor the latter securely to the body. The opening 48 is so located that it is on the same radial which extends from the axis C through the point A. Should the point A be shifted angularly from the positions shown in FIG. 2, the hole 48 will be formed in the body 2 in such position as to lie on the radial which passes through the points C and A.

To condition the apparatus for use, the support member 9 will be fitted in the recess 4 and adjusted to the desired angular position with respect to the longitudinal axis of the holder body 2 by rotating the support 9 about the axis of the pin 8. The support 9 then may be fixed in the desired position by drilling the openings 14 and 15 for the reception of the pin 13 or by soldering the support to the body 2 at the juncture of the walls 6 and 11. The opening 48 will be formed so that its axis is on a straight line passing through the points A and C. Regardless of the angular position of the support 9, it will be supported on its lower surface by the base 5 of the recess and at its rear end by the wall 6 of the body 2.

After the support member 9 is fixed in a selected position of angular adjustment, a bit 28 may be inserted in the pocket 17 in such manner that the sides of the bit engage the sides of the pocket and the lower surface of the bit is supported on the seat 23. For purposes of illustration, the bit is shown in the drawings as having the cutting tip 35 projecting from the forward end of the support member 9, but it will be understood that the tip 36 could be the projecting tip, provided the bit is turned end for end and upside down from the position shown in FIG. 5.

When the bit is inserted in the pocket 17 it will sweep any chips and foreign matter into the grooves 24 and 25 and into the space inwardly of the ridge 23, thereby preventing chips and the like from interfering with proper seating of the bit. Moreover, the cutting tip at the inner end of the pocket may project into the opening 16, thereby preventing damage to the tip.

When the bit has been introduced to the pocket 17, the clamp 38 may be placed in overlying relation to the body and to the bit adjusted, as is permitted by the oversize opening 47, to such position that the lug 41 is accommodated in the opening 30 and the forward end of the clamp bears on the bit. In this position the longitudinal axis of the clamp is substantially parallel to the surface 44 and the foot 42 rests upon the surface 43. As the anchor bolt 46 is threaded into the opening 48, the bolt head 49 will bear against the clamp and cause it to rock about the fulcrum 42 in a counterclockwise direction inasmuch as the fulcrum is rearward of the bolt. Such rocking of the clamp will cause the forward end 39 of the clamp to exert a downward force on the bit 28 to seat the latter firmly on the base of the pocket 17 and will cause lug 41 to bear against the rearward wall of the opening 30 and exert a thrust on the bit having a horizontal component to the left, as viewed in FIG. 1, so as to urge the bit inwardly of the pocket along the radial connecting the points A and C to seat the edges of the bit firmly on the adjacent edges of the pocket. As the bit is thrust inwardly of the pocket, the inclination of the respective sides of the pocket and the bit will cause the bit also to be thrust downwardly, or toward the pocket base 17, thereby providing a rigid support for the bit.

When the holder 1 is mounted on a machine in a position to perform cutting operations on a workpiece, the reaction force exerted on the bit by the workpiece is in two directions, as is indicated by the arrows $a$ and $b$ in FIG. 1. The force $a$ tends to rock the bit clockwise and the force $b$ tends to push the bit into the pocket. Due to the complementary inclination of the adjacent edges of the pocket and the bit the clockwise rocking force on the bit will be overcome and, in fact, the forces thus exerted on the bit will tend to seat the bit more firmly on the sides and base of the pocket, thereby assuring a vibration-free mounting for the bit.

When the cutting tip 35 becomes dull, the clamp 37 may be loosened, the bit removed from the pocket and either discarded or turned end for end so as to present the cutting tip 36 in cutting position.

The disclosed embodiment is representative of a presently preferred form of the invention, but is intended to be illustrative rather than definitive thereof. The invention is defined in the claims.

I claim:

1. A toolholder construction comprising a body member having a forward end and a cam surface rearwardly of said forward end; a support mounted at said forward end of said body member and having a pocket therein, said pocket being defined by a base and upstanding sides, said sides extending along lines converging to a point rearwardly of said forward end of said body member and also along lines converging outwardly from the base of said pocket; a tool bit removably accommodated in said pocket and having sidewalls complementary to the sides of said pocket, said bit having an opening therein; a clamp member overlying said body member and said bit and one end thereof engaging said cam surface and its other end engaging said bit, said clamp member having a projection at its said other end extending into said opening; and anchor means acting between said members and urging said clamp member in a direction to urge said clamp member against said cam surface and said bit, said cam surface acting on said clamp member to urge the latter rearwardly of said forward end of said body whereby said projection acts on said bit to urge the latter rearwardly of said pocket.

2. The construction set forth in claim 1 wherein said bit is substantially diamond-shaped in plan and is reversible end for end in said pocket.

3. The construction set forth in claim 1 including means mounting said support for angular adjustment relative to said body member and including means for securing said support in a selected position of angular adjustment relative to said body member.

4. The construction set forth in claim 1 wherein said body member has a recess at said forward end thereof having an arcuate rear wall and wherein said support is accommodated in said recess and has an arcuate wall in engagement with and complementary to the arcuate wall of said recess.

5. A toolholder comprising a body terminating at its forward end in a recess having a rearward wall formed on an arc; a support member having a back wall complementary to said rearward wall; means mounting said support member in said recess for rotation about the center of said arc and with said back wall seated on said rearward wall, said support member having a tool-bit-accommodating pocket therein defined by a base and an upstanding pair of sides which converge rearwardly to a point on a radial of said arc; a tool bit having sides complementary to the sides of said pocket and removably received therein, said bit having an opening between its ends; a clamp member overlying said bit and having a force-transmitting lug removably received in said opening; and anchor means acting between said body and said clamp means and urging the latter toward said bit and rearwardly of said one end of said body along said radial whereby said bit is urged forcibly against the base of said pocket and rearwardly into forcible engagement with said sides of said pocket.

6. The construction set forth in claim 5 including lock means acting between said body and said support member for fixing the latter against rotation.

7. The construction set forth in claim 5 wherein said sides of said pocket are inclined upwardly from the base of said pocket.

8. The construction set forth in claim 7 wherein the inclination of said sides of said pocket is such that the upper edges of said sides overhang said base.

9. The construction set forth in claim 5 wherein said tool bit has substantially flat opposite surfaces and has two pairs of sides extending from its center to present a substantially diamond-shaped appearance in plan.

10. The construction set forth in claim 9 wherein the sides of said tool bit on one side of its center converge in a direction from one surface thereof and wherein the sides of said bit on the other sides of its center converge in a direction from the opposite surface thereof.

11. The construction set forth in claim 5 wherein the rearward force exerted on said bit by said clamp means is along said radial.

12. The construction set forth in claim 11 wherein said clamp means has an opening therein and wherein said anchor means comprises a bolt extending through the opening in said clamp means and into a secured opening in said body, said second opening being located on said radial.

13. The construction set forth in claim 12 wherein the opening in said clamp means is larger in cross-sectional size than that of said bolt.

14. The construction set forth in claim 5 wherein said sides of said pocket are grooved longitudinally at their juncture with the base of said pocket.

15. The construction set forth in claim 5 wherein the base of said pocket is grooved longitudinally at its juncture with said sides of side pocket.

16. The construction set forth in claim 5 wherein said clamp means includes means forming a fulcrum about which said clamp means may rock in response to securing of said anchor means and in such direction as to cause said projection to urge said tool bit rearwardly into seating engagement with the sides of said pocket.

17. The construction set forth in claim 16 wherein said fulcrum is located rearwardly of said anchor means.